United States Patent
Na et al.

(10) Patent No.: US 12,151,394 B2
(45) Date of Patent: Nov. 26, 2024

(54) PRINTED OBJECT SURFACE TREATMENT-TYPE 3D PRINTER FOR CONSTRUCTION

(71) Applicant: SAMSUNG E&A CO., LTD., Seoul (KR)

(72) Inventors: Ho Sung Na, Hanam (KR); Dong Hyun Kim, Seoul (KR); Kwan Seon Hong, Seoul (KR); Hye Jin Ryu, Hanam (KR)

(73) Assignee: SAMSUNG E&A CO., LTD., Seoul (KR)

( * ) Notice: Subject to any disclaimer, the term of this patent is extended or adjusted under 35 U.S.C. 154(b) by 0 days.

(21) Appl. No.: 18/265,064

(22) PCT Filed: Jan. 5, 2022

(86) PCT No.: PCT/KR2022/000193
§ 371 (c)(1),
(2) Date: Jun. 2, 2023

(87) PCT Pub. No.: WO2022/149861
PCT Pub. Date: Jul. 14, 2022

(65) Prior Publication Data
US 2023/0339138 A1 Oct. 26, 2023

(30) Foreign Application Priority Data
Jan. 7, 2021 (KR) .......................... 10-2021-0001791

(51) Int. Cl.
*B28B 1/00* (2006.01)
*B33Y 30/00* (2015.01)

(52) U.S. Cl.
CPC .............. *B28B 1/001* (2013.01); *B33Y 30/00* (2014.12)

(58) Field of Classification Search
CPC ........... B05B 1/14; B05B 1/20; B29C 64/188; B29C 64/194
See application file for complete search history.

(56) References Cited

U.S. PATENT DOCUMENTS

| | | | |
|---|---|---|---|
| 2015/0072081 A1* | 3/2015 | Monchamp | B05B 13/0436 427/427.3 |
| 2017/0028633 A1* | 2/2017 | Evans | B29C 70/16 |
| 2019/0061061 A1* | 2/2019 | Fischer | B33Y 30/00 |

FOREIGN PATENT DOCUMENTS

| | | | | |
|---|---|---|---|---|
| CN | 106985258 A | | 7/2017 | |
| CN | 109604099 A | * | 4/2019 | B05B 13/04 |

(Continued)

OTHER PUBLICATIONS

Notice of Allowance issued in Korean Application No. 2021-0001791, dated Nov. 5, 2021, 1 pg.

(Continued)

*Primary Examiner* — Seyed Masoud Malekzadeh
*Assistant Examiner* — Xinwen Ye
(74) *Attorney, Agent, or Firm* — Panitch Schwarze Belisario & Nadel LLP (57) ABSTRACT

The present invention relates to a 3D printer for construction for printing and forming various structures, in which a spray pipe follows a nozzle for discharging concrete or mortar, and sprays a liquid material onto the surface of a printed object, thereby enabling the liquid material to be applied on the surface of the printed object. Through the present invention, the printing of the printed object and the spraying of the liquid material onto the surface of the printed object may be carried out simultaneously by means of the 3D printer for construction, and thus a rapid and uniform coating treatment of the printed object is possible, and an adequate wet state of the tissue of the printed object may be maintained.

10 Claims, 12 Drawing Sheets

(56) References Cited

FOREIGN PATENT DOCUMENTS

| | | |
|---|---|---|
| CN | 108247056 B | 4/2020 |
| KR | 20170120762 A | 11/2017 |
| KR | 20180016100 A | 2/2018 |
| KR | 20180064332 A | 6/2018 |
| KR | 101895151 B1 | 9/2018 |
| KR | 20190022080 A | 3/2019 |
| KR | 20200019273 A | 2/2020 |
| KR | 20200142925 A | 12/2020 |
| KR | 102331860 B1 | 12/2021 |

OTHER PUBLICATIONS

Notice of Non-Final Rejection, issued in Korean Application No. 2021-0001791, dated May 12, 2021, 5 pps.
International Search Report (ISR) and Written Opinion (WO), dated Apr. 18, 2022, issued in corresponding International Application No. PCT/KR2022/000193, with Eng. Lang. translation of ISR, 7 pages.
The First Office Action, dated Dec. 15, 2023, issued in Chinese Application No. 202280007906.9, 16 pages (including English-language translation).

* cited by examiner

FIG. 1

PRIOR ART

PRIOR ART

PRINTED OBJECT SURFACE TREATMENT-TYPE 3D PRINTER FOR CONSTRUCTION

TECHNICAL FIELD

The present invention relates to a 3D printer for construction for printing and forming various structures, in which a spray pipe 60 follows a nozzle 10 discharging concrete or mortar and sprays a liquid material onto the surface of a printed object, thereby enabling an application of the liquid material on the surface of the printed object.

BACKGROUND ART

A 3D printer for construction is an apparatus for building a structure of a predetermined shape by linearly extruding and stacking a fluid material e.g., concrete or mortar, and as such can omit or minimize the mold construction process necessarily required in the conventional construction of concrete structures and may have a significant advantage in terms of formability, construction time and etc. and Korean Patent NO. 1895151 may be cited as a related prior art.

Figure 1:
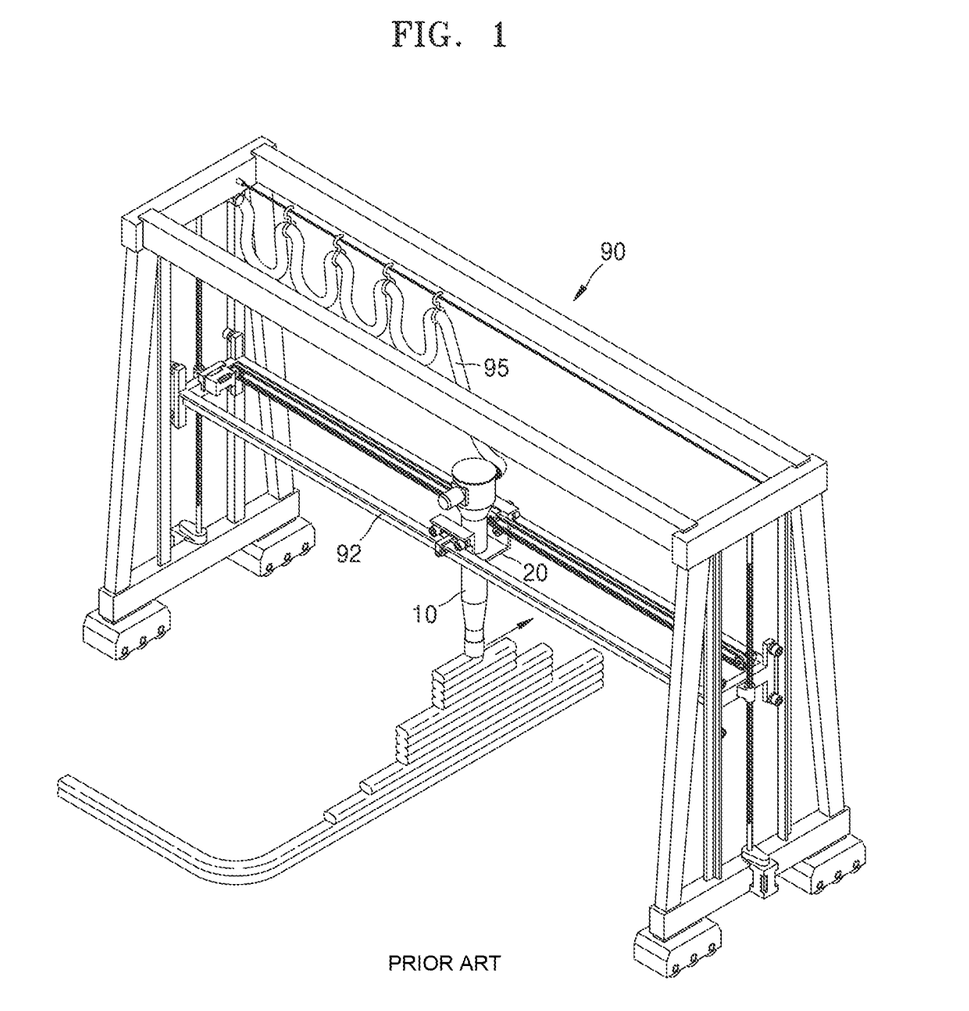
FIG. 1 illustrates an example of a 3D printer for construction in the prior art.

In addition to Korean Patent NO. 1895151, in a conventional 3D printer for construction as shown in FIG. 1, a fluid material such as concrete or mortar is linearly extruded via a nozzle 10 mounted on a movable body 20, and a structure is formed as the linearly extruded printed object is stacked and cured, and printing of a wall body is illustrated in FIG. 1 by way of example.

An object printed by a 3D printer for construction as described above basically has a form of a linear extrudate and a planned structure is formed as a linear extrudate is stacked along the moving path of a movable body 20 and a nozzle 10. Although the 3D printer illustrated in FIG. 1 is configured such that the nozzle 10 for discharging a printed object is mounted on the movable body 20, wherein the movable body 20 is configured to make a horizontal reciprocating motion along a rail 92 liftably mounted on a gantry crane-type frame 90, other various schemes other than the aforementioned configuration that allow free movement of the movable body 20 mounted with the nozzle 10, e.g., a jib crane, may be applied.

DISCLOSURE

Technical Problem

As described above, the printing method of a 3D printer for construction is completely differentiated from the conventional molding method of concrete structures in which concrete is poured after a mold is constructed and the mold is removed only after curing is complete. As such, the printing method of a 3D printer for construction may be regarded as a method in which forming and curing are performed in a state where a stacked body of linear extrudates are completely exposed, which makes rapid drying of the surface portion of each printed object inevitable.

That is, as shown in FIG. 1, in the stacked body constituting the printed object, complete exclusion of the wetting of molded objects during curing by molds, e.g., formworks, causes the printed object to rapidly dry immediately after printing and as a result, serious issues such as cracking and decreased strength may arise.

In this regard, in the prior art, once printing of a basic structure is complete, a post-treatment operation such as a surface treatment or plastering is performed, wherein the surface treatment forms a separate coating layer on the surface of the printed object. However, since they can only be performed entirely by manpower, such post-treatment processes inevitably become factors contributing to a prolonged construction time and increased construction costs.

Technical Solution

To address the aforementioned issues, the present invention provides a 3D printer for construction and in particular, a printed object surface-treatment type 3D printer for construction wherein a spray pipe 60 mounted on a movable body 20 and configured to follow a nozzle 10 discharging a fluid material is installed, wherein the spray pipe 60 moves along with movement of the movable body 20 and the nozzle 10, and a liquid material is sprayed through the spray pipe 60 onto the surface of a printed object extruded from the nozzle 10.

In addition, the printed object surface-treatment type 3D printer for construction is characterized in that a rotatable body 30 is installed on the movable body 20, the rotatable body 30 having an axis of rotation parallel to a discharge direction of the nozzle 10, wherein a support shaft 40 of the spray pipe 60 is connected to the rotatable body 30 such that as the rotatable body 30 rotates, the support shaft 40 and the spray pipe 60 move along a circular arch centered on the axis of rotation.

In addition, the printed object surface-treatment type 3D printer for construction is characterized in that a planar rotatable plate 70 is connected to the rotatable body 30, the support shaft 40 of the spray pipe 60 being connected to one end of the rotatable plate 70, wherein the inside of the rotatable plate 70 is hinged to the rotatable body 30 and the other end of the rotatable plate 70 is connected to the rotatable body 30 via an elastic body 73, such that as the elastic body 73 is stretched or contracted, the rotatable plate 70 rotates on a plane.

In addition, the printed object surface-treatment type 3D printer for construction is characterized in that a planar rotatable plate 70 is connected to the rotatable body 30, wherein a roller 50 is connected to one end of the rotatable plate 70, wherein the inside of the rotatable plate 70 is hinged to the rotatable body 30 on a plane and the other end of the rotatable plate 70 is connected to the rotatable body 30 via an elastic body 73, such that as the elastic body 73 is stretched or contracted, the rotatable plate 70 is rotated on a plane and the roller 50 is in close contact with a surface of a printed object.

In addition, the printed object surface-treatment type 3D printer for construction is characterized in that an annular rack 35 is installed on the rotatable body 30, the annular rack 35 having a planar center coincident with the axis of rotation of the rotatable body 30, and a pinion 25 is installed on the movable body 20, the pinion 25 being connected to a driving motor 23 and engaged with the rack 35, such that as the pinion 25 rotates, the rack 35 and the rotatable body 30 rotate.

Advantageous Effects

According to the present invention, printing of a printed object and spraying of a liquid material onto the surface of the printed object may be carried out simultaneously by a 3D printer for construction, thus making it possible to perform rapid and uniform coating of the printed object and maintaining an appropriate wet state of a tissue of the printed object.

In particular, issues considered inevitable of a conventional 3D printer for construction, e.g., rapid drying and the subsequent cracking and decreased strength of the surface layer of a printed object, may be dramatically mitigated and inhibited and as a result, an improvement in the outer appearance as well as structural performance of the finished structure may be achieved.

In addition, since coating and plastering operations performed following the printing of a structure by a 3D printer for construction in the prior art can be omitted, the overall process may be simplified, construction time may be shortened, and construction costs may be reduced.

MODE FOR INVENTION

The configuration and mechanism of the present invention will be described in detail with reference to the accompanied drawings below.

Figure 2:
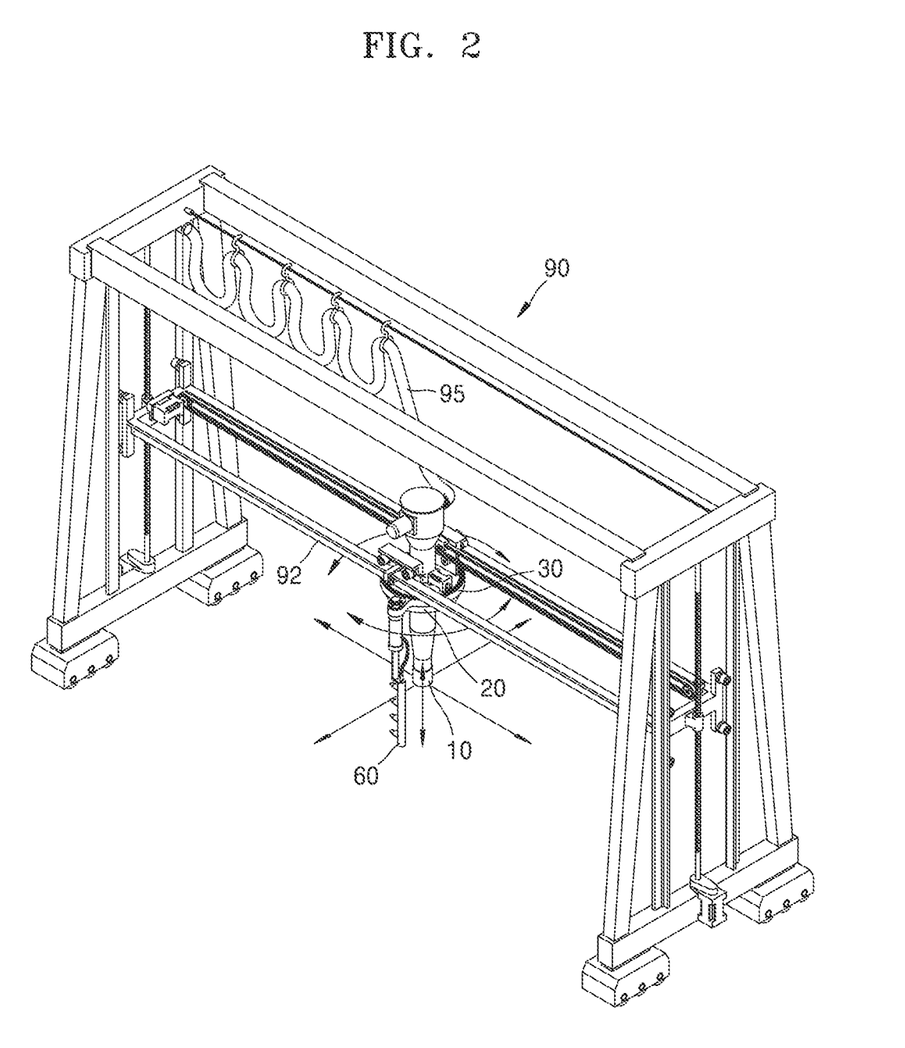
FIG. 2 is a perspective view of an embodiment of the present invention.

First of all, FIG. 2 illustrates an overall configuration of a 3D printer for construction to which an embodiment of the present invention is applied. In particular, the illustrated embodiment shows that an elevating type rail 92 is configured on a gantry crane-type frame 90, and a lateral reciprocating motion of a movable body 20 along this rail 92 gives a motion to the movable body 20 and the nozzle 10.

In particular, the self-propelled gantry crane-type frame 90 may be applied as a basic framework of the 3D printer, wherein forward and backward motions of the self-propelled frame 90 in a longitudinal direction give a forward F motion or a backward B motion to the movable body 20 mounted with the nozzle 10, vertical movement of the movable body 20 is carried out by the rail 92 liftably mounted on the frame 90, and as the movable body 20 travels along the rail 92 in a lateral direction, left L movement or right R movement of the nozzle 10 is carried out.

Figure 3:
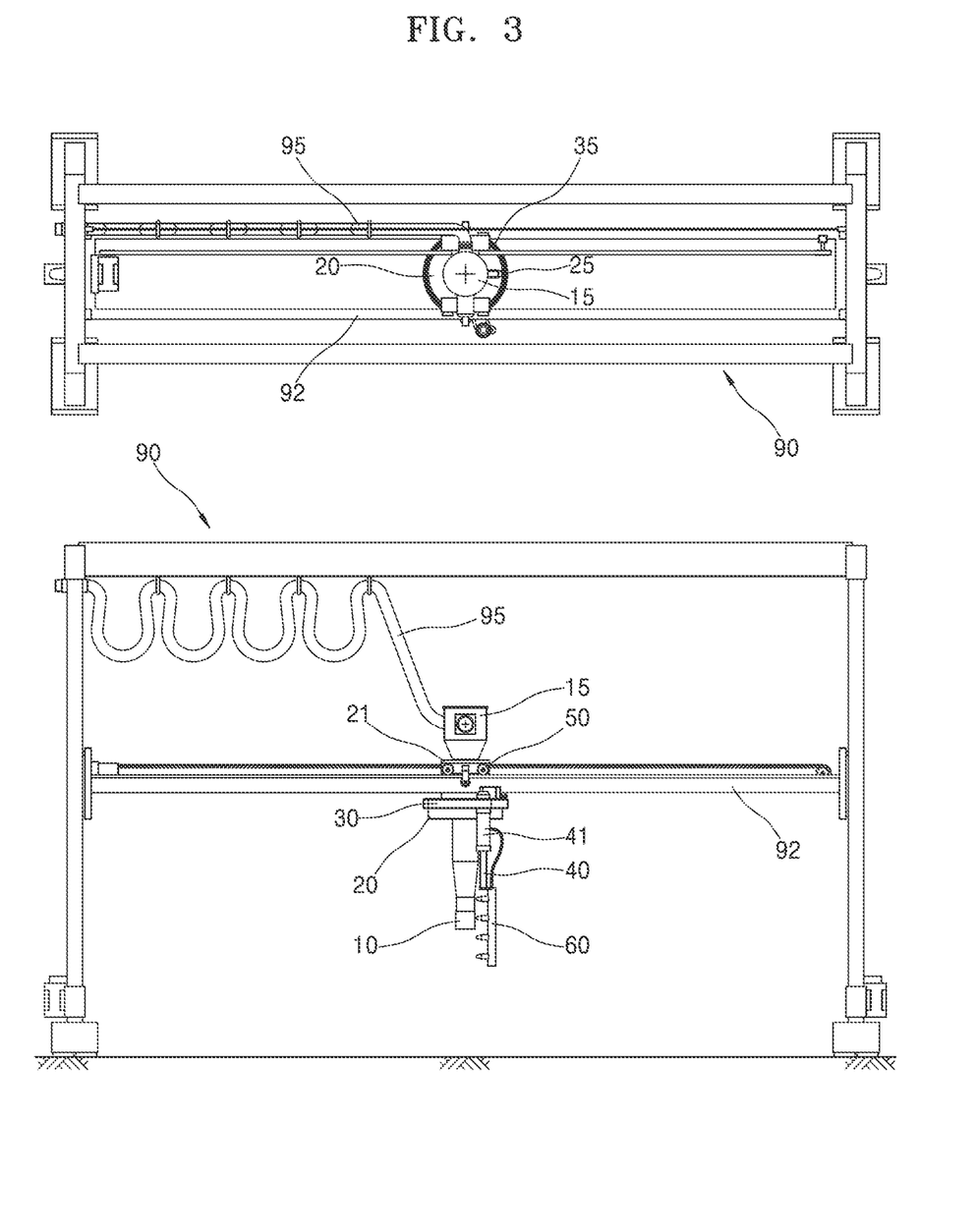
FIG. 3 is a front view and plan view of the embodiment of FIG. 2.
Figure 4:
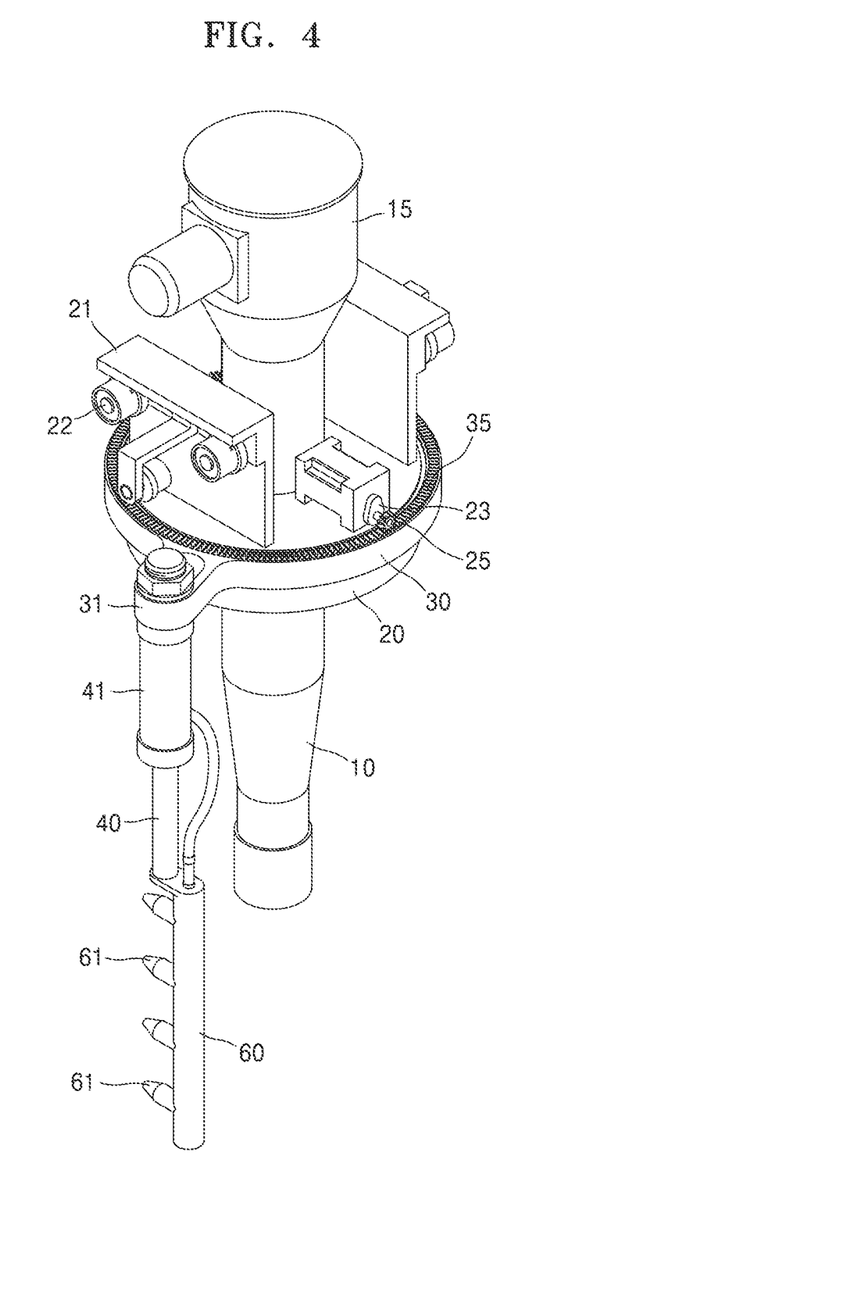
FIG. 4 is a perspective view of a main part of the embodiment of FIG. 2.

As shown in FIG. 3 and FIG. 4, a bracket 21 mounted with a plurality of driving wheels 22 may be joined to the movable body 20 mounted with the nozzle 10, and traveling of the driving wheels 22 along the rail 92 gives a reciprocating motion to the bracket 21 and the movable body 20 in a direction parallel to the rail 92. Although the illustrated embodiment shows that the movable body 20 is driven by a belt connected to the bracket 21, a separate power source other than a belt may be connected to the driving wheels 22 of the movable body 20 to make self-propelled driving possible.

In particular, the nozzle 10 mounted on the movable body 20 may be configured to discharge below the movable body 20 a fluid material e.g., concrete and mortar so as to allow a linear extrudate forming each printed layer to be stacked along a moving path of the movable body 20 to thereby form a desired structure. As shown in FIGS. 2 to 4, a hopper 15 in which a fluid material can be temporarily held may be configured above the nozzle 10 and a supply pipe 95 may be connected to the hopper 15 to continuously supply the fluid material to the nozzle 10.

As such, movement of the movable body 20 is carried out by the self-propelled frame 90 and the rail 92 in the embodiments illustrated in the drawings; however, if the movable body 20 mounted with the nozzle 10 is allowed to move freely in vertical and lateral directions, various types such as a jib crane, may be applied as a main body of the 3D printer for construction of the present invention.

As shown in FIG. 4 illustrating main components of the present invention, the 3D printer for construction of the present invention includes a spray pipe 60 mounted on a movable body 20 and following the nozzle 10 to discharge a fluid material wherein the spray pipe 60 moves along with movement of the movable body 20 and the nozzle 10. In particular, as illustrated on the right side in FIG. 5, a liquid material may be sprayed through the spray pipe 60 onto the surface of a printed object extruded from the nozzle 10, and as a result, an application layer of a liquid material is formed on the surface of the printed object, so that the moisturizing treatment of the tissue of the printed object and the formation of a film on the surface of the printed object can be performed.

As shown in FIG. 4, the spray pipe 60 of the present invention may be a pipe body positioned parallel to a discharge direction of the nozzle 10, and a plurality of spray holes 61 facing a printed object may be provided on the spray pipe 60. In particular, the spray pipe 60 may be connected to a supply hose continuously supplying a liquid material thereto from the outside, and the liquid material pumped to the spray pipe 60 may be sprayed from the spray holes 61 and uniformly coated on the surface of the printed object.

Here, examples of the liquid material sprayed onto the printed object may include various coating liquids, reinforcing chemicals, and the like, as well as water for wetting the surface of the printed object.

In particular, the spray pipe 60 as a straight-pipe body may be installed parallel to the direction in which the nozzle 10 discharges the fluid material, such that liquid material is sprayed via the spray pipe 60 and spray holes 61 onto the surface of a printed object formed by stacking of linear extrudates discharged from the nozzle 10.

Figure 5:
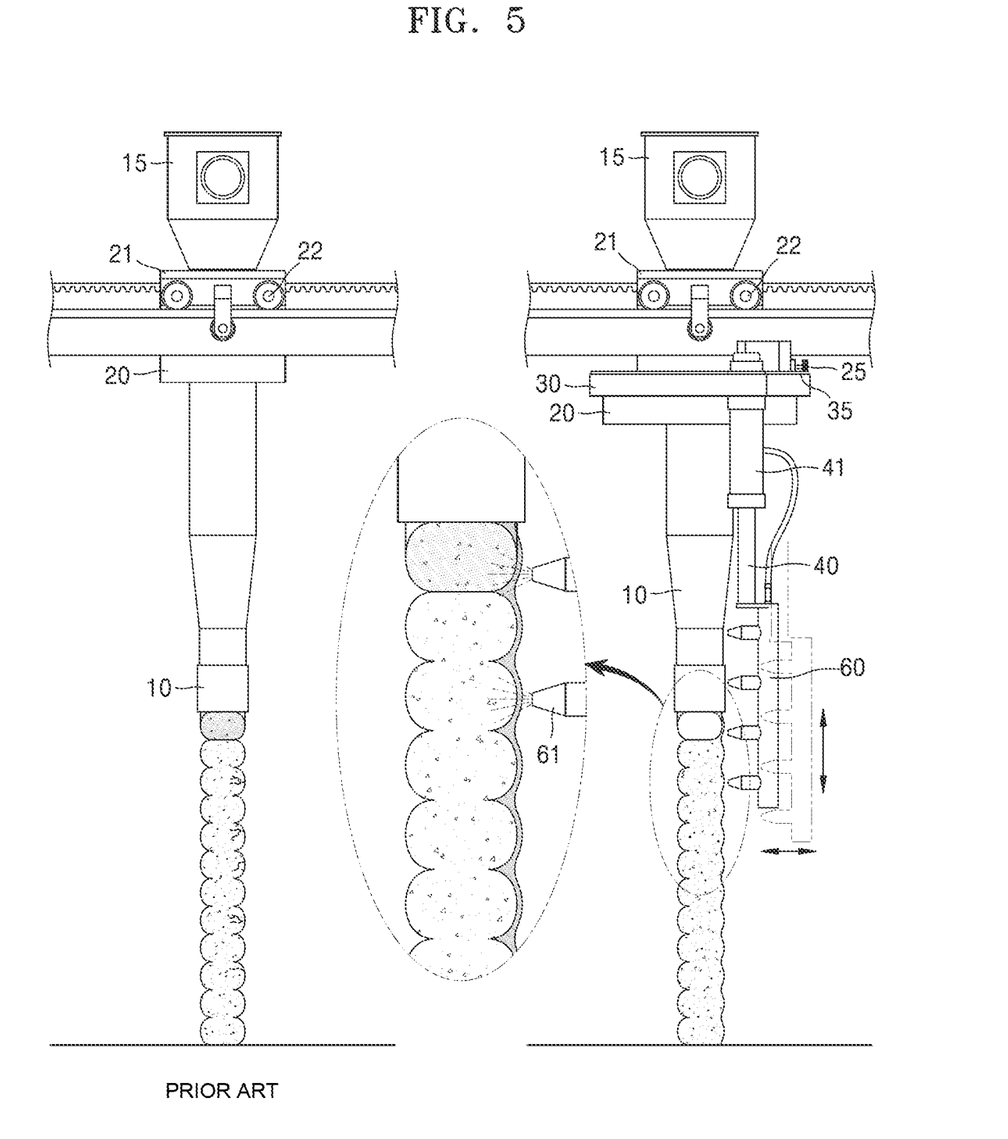
FIG. 5 is a comparison diagram of operation methods of the prior art and the present invention.

As can be seen in FIG. 5, which comparatively shows a printed object printed by the present invention and a printed object printed by a prior art, the prior art illustrated on the left side of the drawing has a discontinuous surface between printed layers and severe surface irregularities resulting therefrom as well as inevitable crack formation due to rapid drying of the surface portion of the printed object, whereas the present invention illustrated on the right side of the drawing shows formation of a coating layer on the surface and high-level wetting of tissues of the printed object, thus ensuring both improved outer appearance and structural stability.

As illustrated in FIG. 4 and on the right side of FIG. 5, in the present invention, the spray pipe 60 may be connected to the movable body 20 via a support shaft 40, an elevating body 41, a rotable body 30, etc. wherein the range of facing range between the spray pipe 60 and the printed object may be adjusted as the spray pipe 60 is lifted or lowered along with the support shaft 40 being lifted or lowered by the elevating body 41 connected to an upper end of the support shaft 40.

Examples of the elevating body 41 may include a fluid pressure cylinder such as a hydraulic cylinder and a pneumatic cylinder, and an axial moving device or telescopic device, such as a linear actuator. Since the printed object-facing range of the spray pipe 60 is adjusted by driving the elevating body 41, the coating range of the liquid material may be flexibly adjusted depending on the state of stacking or material characteristics of the printed object.

Figure 6:
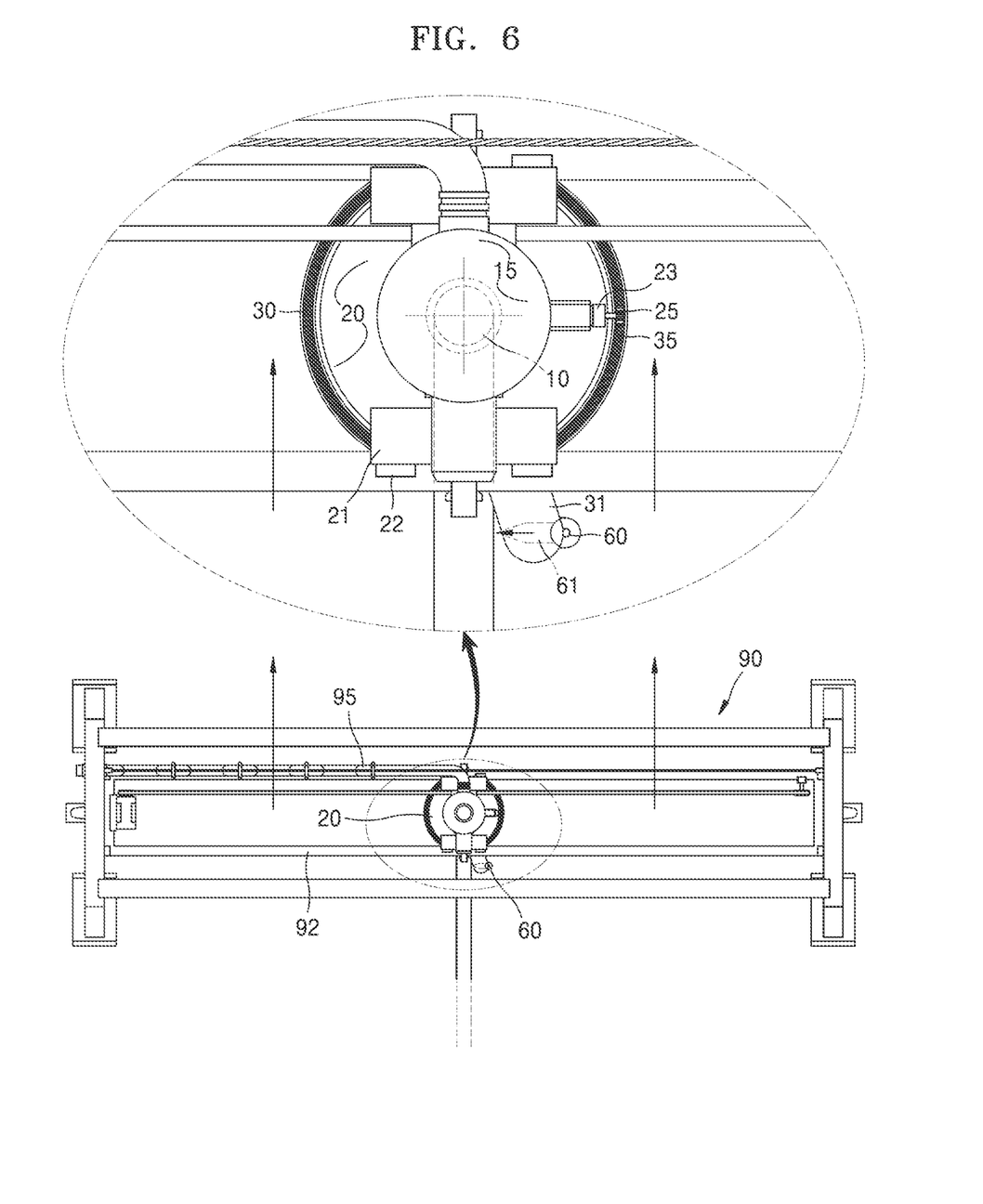
FIG. 6 is a plan view of an operating state of the embodiment of FIG. 2.

In addition, as shown in FIG. 4 and FIG. 6 in the present invention, the spray pipe 60 is configured to be able to follow the movement of the nozzle 10 and at the same time, to be able to rotate on a plane as needed, wherein this configuration may be achieved through the configuration in which a rotatable body 30 having an axis of rotation parallel to a discharge direction of the nozzle 10 is mounted on the movable body 20 and a support shaft 40 of the spray pipe 60 is connected to the rotatable body 30. As a result, as the rotatable body 30 rotates, the support shaft 40 and the spray pipe 60 may move along a circular arc centered on the rotation shaft.

In the illustrated embodiment, mounting of the spray pipe 60 on the rotatable body 30 has a structure in which an upper end of the elevating body 41 described above is mounted on a peripheral portion of the rotatable body 30 and the support shaft 40 is connected to a lower end of the elevating body 41, wherein an upper end of the spray pipe 60 is connected to the support shaft 40.

In addition, as shown in the illustrated embodiment, a protruded plate 31 protruding outwardly from the periphery of the rotatable body 30 may be utilized as an installation site for the spray pipe 60 on the rotatable body 30. In particular, as shown in FIG. 4 and FIG. 6, in mounting the spray pipe 60 on the protruded plate 31 of the rotatable body 30, an elongated hole may be created in the protruded plate 31 and, a spray pipe 60—connecting component, e.g., the elevating body 41, may be mounted in this elongated hole, such that by adjusting a mounting position of the spray pipe 60—connecting component in the elongated hole, the connecting point of the spray pipe 60 on a plane, that is, the planar distance between the center point of the spray pipe 60 and the center point of the nozzle 10 may be controlled.

As described above, by controlling the distance between the center point of the spray pipe 60 and the center point of the nozzle 10, a flexible adjustment may be made to the position of the spray pipe 60 even when the planar width of the printed object varies due to a change in the diameter of discharge holes or a change in the discharge speed of the nozzle 10.

The planar rotation and arc movement of the rotatable body 30 with respect to the movable body 20 of the 3D printer for construction of the present invention may be realized as illustrated in FIG. 4 through a specific configuration in which an annular rack 35 is mounted on the rotatable body 30, a planar center of the annular rack 35 coinciding with the axis of rotation of the rotatable body 30, and a pinion 25 is installed on the movable body 20, the pinion 25 being connected to a driving motor 23 and engaged with the rack 35, such that as the pinion 25 rotates, the rack 35 and the rotatable body 30 rotate.

Here, the mutually rotatable connection of the movable body 20 and the rotatable body 30 as shown in FIG. 4 and FIG. 6 is preferably configured to have an axis of rotation that coincides with the planar center point of the nozzle 10. To this end, as shown in the same drawings, it is preferable that the main body of the movable body 20 is configured in the form of a cylinder or a disc having the nozzle 10 mounted in the center thereof, and the rotatable body 30 is configured in an annular body, such that the movable body 20 and the rotatable body 30 are joined concentrically on a plane. Although not illustrated in the drawings, a bearing or a lubricating means may be configured between the outer circumferential surface of the movable body 20 and the inner circumferential surface of the rotatable body 30 to facilitate the rotation of the rotatable body 30.

Consequently, the present invention may be regarded as having a structure in which the nozzle 10, the main body of the movable body 20, the rotatable body 30, and the annular rack 35 are all joined or installed so as to be concentric on a plane, and as the pinion 25 engaging with the rack 35 is rotated by the driving motor 23 affixed to the movable body 20, the rotatable body 30 and components mounted thereon, such as the spray pipe 60, are made to rotate or move along a circular arc on a plane.

The rotation direction and speed of the rotatable body 30 mounted with the spray pipe 60 may be varied by factors such as forward rotation, reverse rotation, or an increase or decrease in the rotation speed of the driving motor 23. Such control over the driving motor 23 and the rack 35 may be automatically performed by a control panel or a computing controller connected to the driving motor 23.

Figure 7:
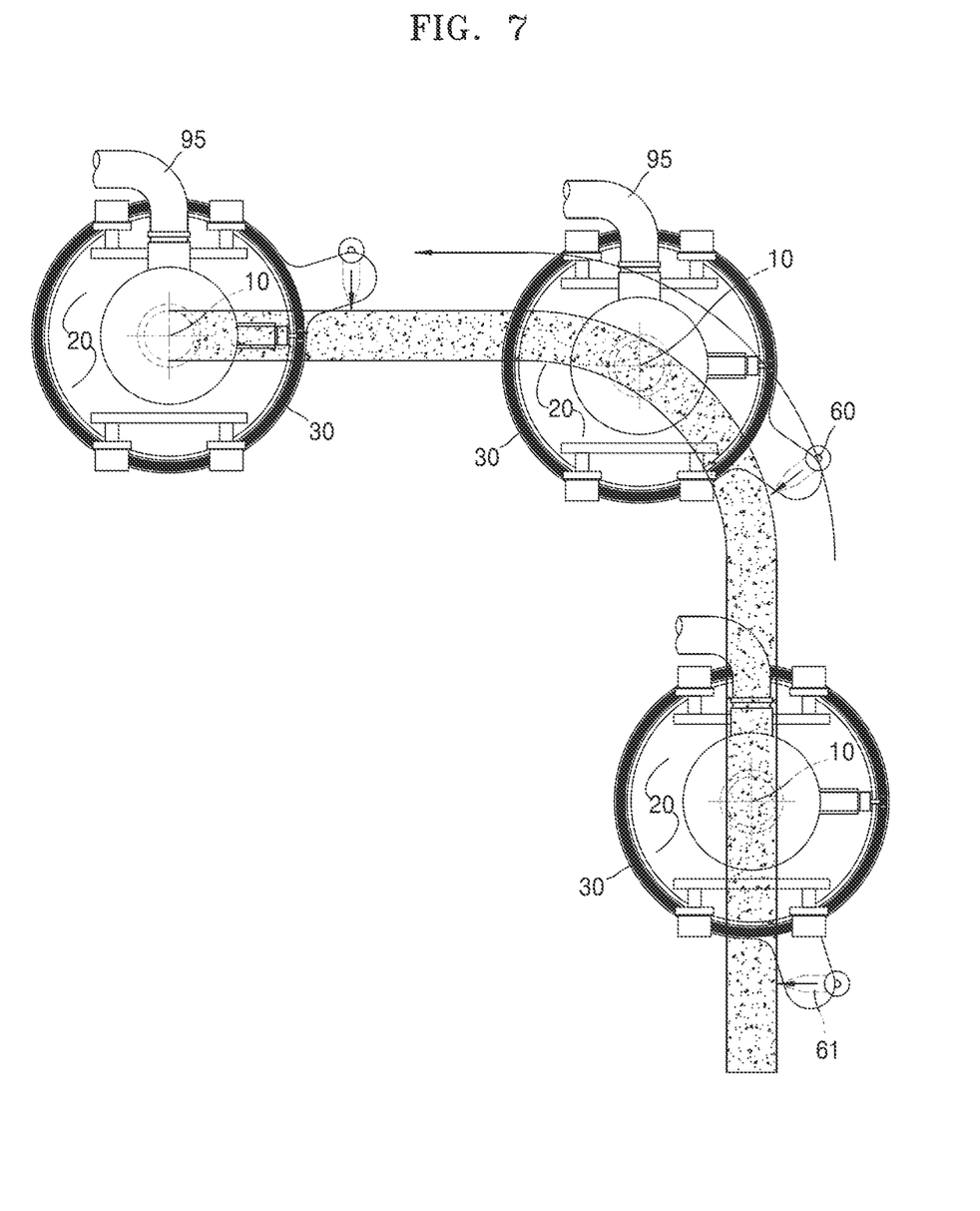
FIG. 7 is an explanatory view of an operation method of the embodiment of FIG. 2.

In particular, this planar rotating motion of the spray pipe 60 as shown in FIG. 7 may be a useful function to allow the spraying of liquid material by the spray pipe 60 and the printed object-facing state of the spray holes 61 to be continuous even at a planar linearly changing area of the printed object. As illustrated in the same drawing, this function may allow stable following movement of the spray pipe 60 and allow the spray holes 61 to maintain the state of facing the printed object in all areas including the site toward which the nozzle 10 advances (top of the drawing), the site for lateral movement of the nozzle 10 (right side of the drawing), and the curved site connecting these two sites.

Figure 8:
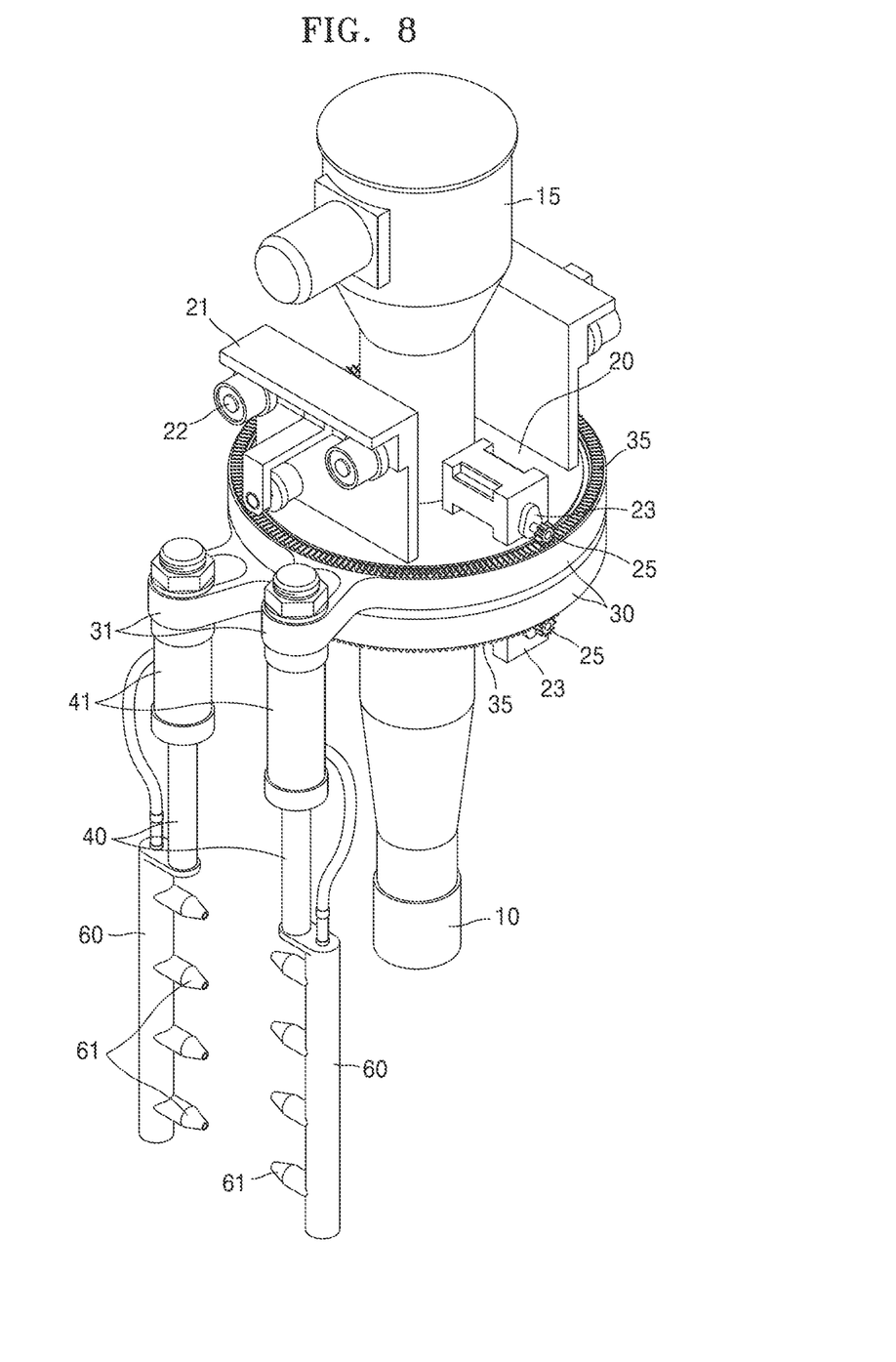
FIG. 8 is a perspective view of a main part of a double-side treatment type embodiment of the present invention.
Figure 9:
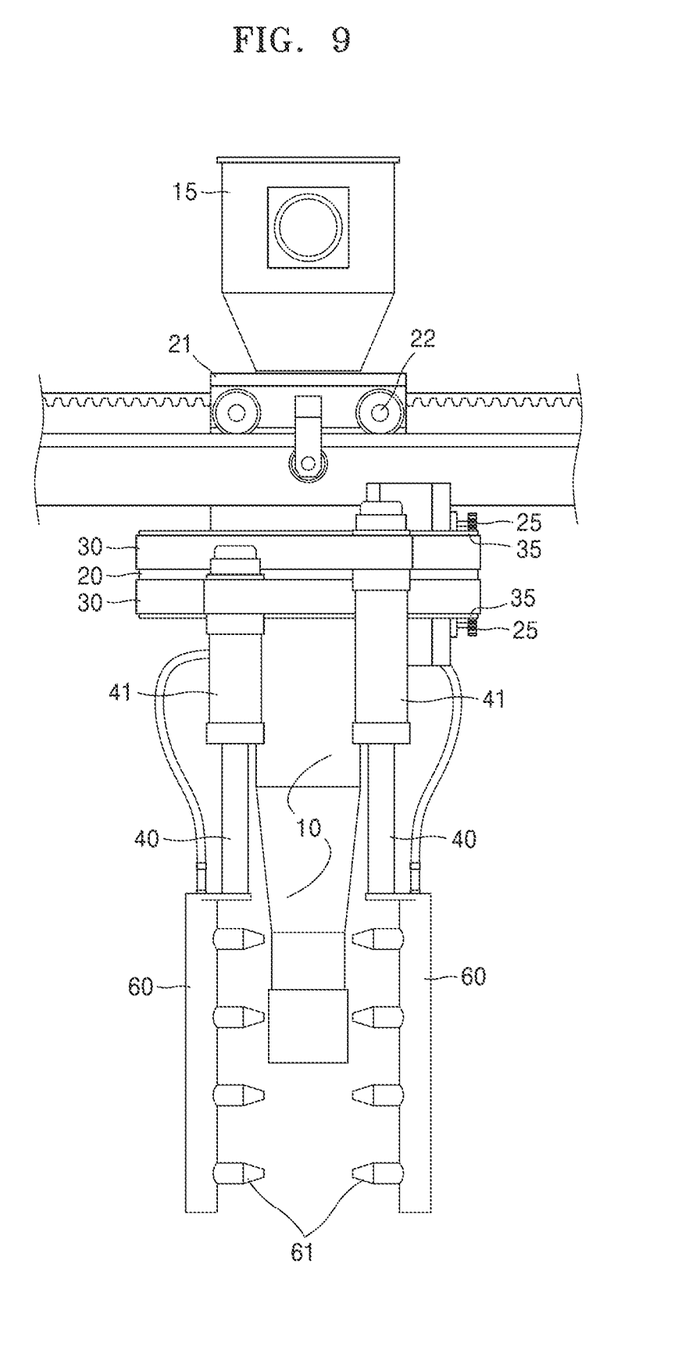
FIG. 9 is a front view of a main part of the embodiment of FIG. 8.

In addition, FIG. 8 and FIG. 9 show a double-side treatment type embodiment of the present invention. In the illustrated embodiment, which shows a wall body as a printed object, separate spray pipes 60 are configured on both sides of the planar printed object to be able to spray a liquid material to both sides of the printed wall body, wherein these spray pipes 60 and spray holes 61 on both sides are configured symmetrically with respect to the central line of the planar printed object.

In this double-side treatment type embodiment, a rotatable body 30 on which a spray pipe 60 is mounted may be provided for each spray pipe 60. As shown in FIG. 9, the rotatable body 30 may be separately provided on each of an upper portion and a lower portion of a single movable body 20, wherein a rack 35, a pinion 25, and a driving motor 23 for driving a set of these two rotatable bodies 30 are also configured on each of an upper rotatable body 30 and a lower rotatable body 30.

In the embodiment illustrated in FIG. 8 and FIG. 9, the rack 35 of the upper rotatable body 30 is mounted on an upper side of the rotatable body 30, and the rack 35 of the lower rotatable body 30 is mounted on a lower side of the rotatable body 30, wherein the pinion 25 and the driving motor 23 for driving the upper rotatable body 30 are mounted on an upper side of the movable body 20, and the pinion 25 and the driving motor 23 for driving the lower rotatable body 30 are mounted on a lower side of the movable body 20, such that the upper rotatable body 30 and the lower rotatable body 30, each provided with a spray pipe 60, are not dependent or synchronized with each other, and are operable in a completely independent manner from each other.

Figure 10:
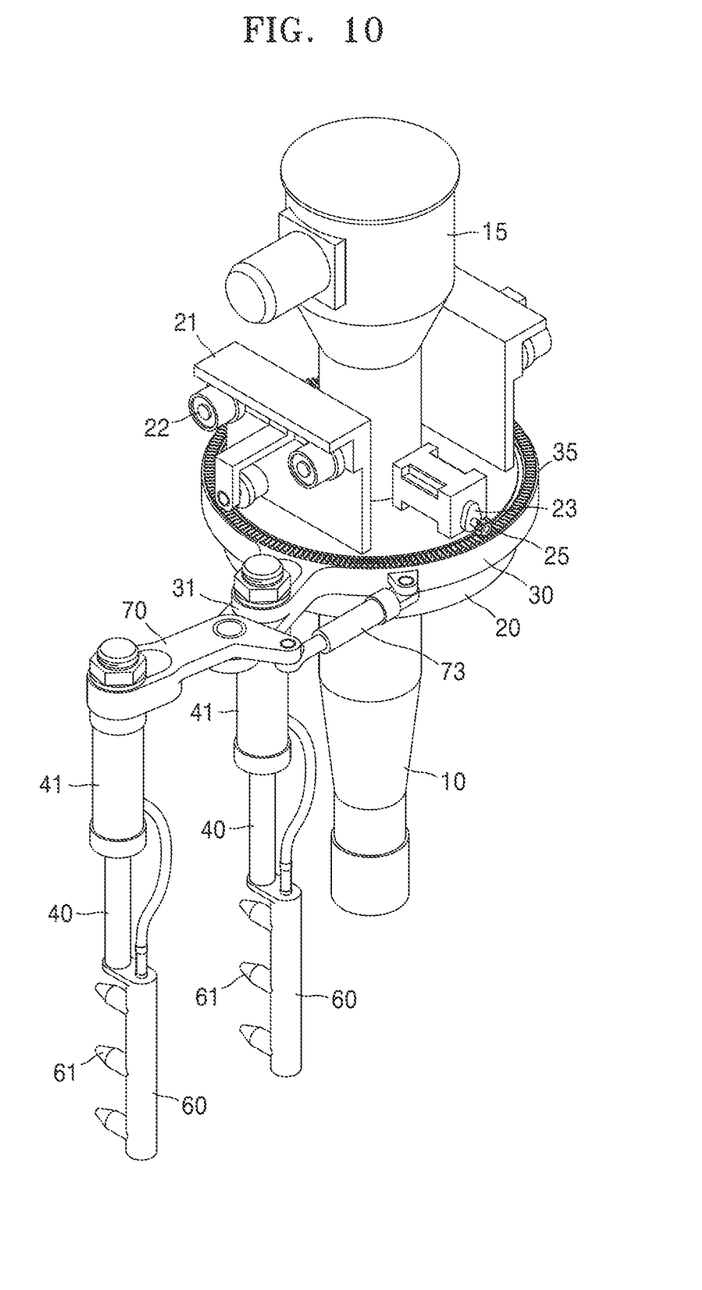
FIG. 10 is a perspective view of a main part of a multi-treatment type embodiment of the present invention.
Figure 11:
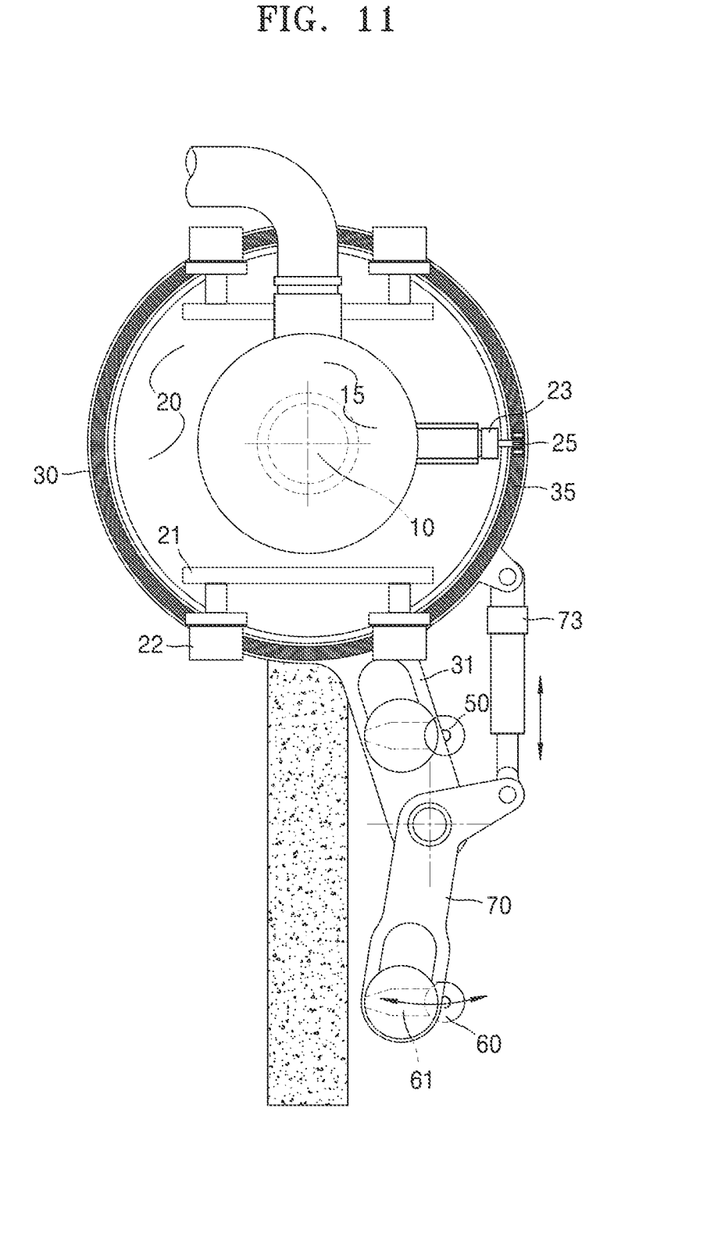
FIG. 11 is a diagram showing an operating method of the embodiment of FIG. 10.

Illustrated in FIG. 10 and FIG. 11 is a multi-treatment type embodiment in which cleaning of a printed object by spray pipes 60 is carried out, not by a single application of a liquid material by a single spray pipe 60 for each surface of the printed object, but by means of an additional application spray pipe 60 that follows a preceding spray pipe 60 for initial application.

In particular, as shown in FIG. 10 and FIG. 11, a rotatable plate 70 may be connected to the rotatable body 30, a support shaft 40 of a spray pipe 60 being installed at one end of the rotatable plate 70, wherein the inside of the planar rotatable plate 70 is hinged to the rotatable body 30, and the other end of the rotatable plate 70 may be connected to the rotatable body 30 via an elastic body 73, such that as the elastic body 73 is stretched or contracted, the rotatable plate 70 rotates on a plane.

In the illustrated embodiment, the planar rotatable plate 70 is a plate body having a bent central portion, and by a hinge configured in the central portion, the rotatable body 30 and the rotatable plate 70 are connected to each other in a freely rotatable manner with respect to a hinge axis parallel to the nozzle 10.

In addition, as shown in FIG. 11, between the other end of the rotatable plate 70 opposite to one end thereof mounted with a spray pipe 60, and a peripheral portion of the rotatable body 30, an elastic body 73 may be provided such that as the elastic body 73 is stretched or contracted, the rotatable plate 70 rotates so that the angle of the planar rotatable plate 70 may be changed.

The elastic body 73 for connecting the rotatable plate 70 and the rotatable body 30 may utilize an axial changing or moving device, such as a fluid pressure cylinder, and the distance between the outer circumferential surface of the spray pipe 60 mounted in the rotatable plate 70 and the central line of the printed object may be adjusted by varying the plane angle of the rotatable plate 70.

Accordingly, via components related to the rotatable plate 70, stable movement of a following spray pipe 60 around a linearly changing section of a printed object may be made possible, and furthermore, by supplying different liquid materials to a preceding spray pipe 60 and the following spray pipe 60, as needed, sequential applications of different liquid materials may be carried out.

Figure 12:
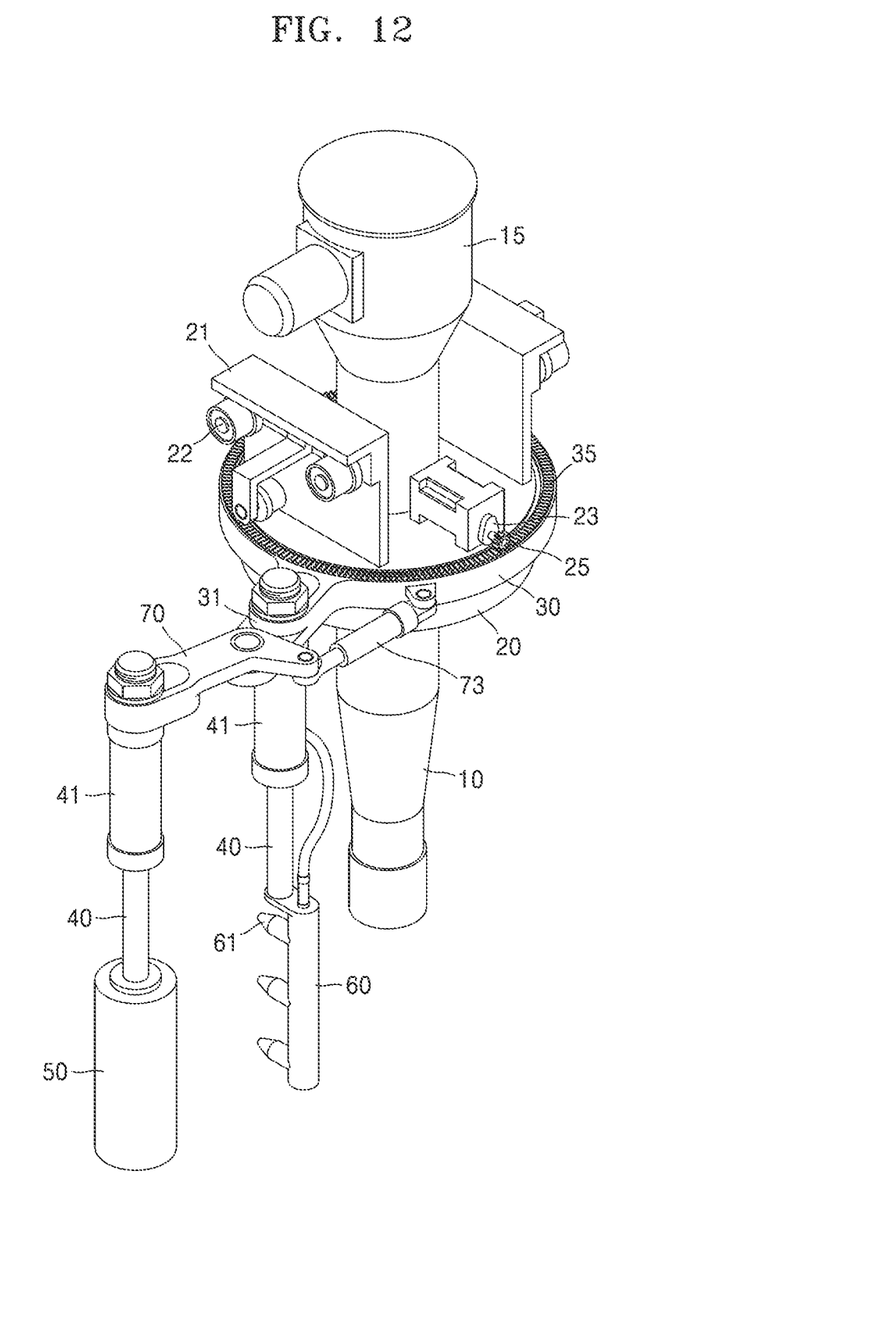
FIG. 12 is a perspective diagram of a main part of a complex treatment type embodiment of the present invention.

FIG. 12 shows an application of the rotatable plate 70—related components described above to allow a surface compression by rollers 50 instead of application of liquid material as a treatment following the preceding spray pipe 60. In particular, this application allows not only a high level of planarization of the liquid material coating layer and the surface layer of a printed object, but also a complex treatment that densifies the tissues of the printed objects of a specific site.

That is, as shown FIG. 12, a planar rotatable plate 70 is connected to a rotatable body 30, wherein a roller 50 is connected to one end of the rotatable plate 70, wherein the inside of the planar rotatable plate 70 is hinged to the rotatable body 30 and the other end of the rotatable plate 70 is connected to the rotatable body 30 via an elastic body 73, such that as the elastic body 73 is stretched or contracted, the rotatable plate 70 rotates on a plane. Here, the basic operation method such as rotation operation of the rotatable plate 70 and direction control of the roller 50 are the same as described with respect to the embodiment in FIG. 10 and FIG. 11 above.

The invention claimed is:

1. A printed object surface-treatment type 3D printer for construction, comprising: a movable body (20); a nozzle (10) mounted on the movable body (20); a spray pipe (60) configured to follow the nozzle (10); and a plurality of spray holes (61) mounted on the spray pipe (60), wherein the nozzle (10) is configured to discharge a fluid material, wherein the spray pipe (60) is configured to move along with movement of the movable body (20) and the nozzle (10), wherein the spray pipe (60) is connected to the movable body (20) via a support shaft (40), an elevating body (41) and a rotatable body 30, wherein a range between the spray pipe (60) and a printed object is adjusted as the spray pipe (60) is lifted or lowered along with the support shaft (40) being lifted or lowered by the elevating body (41) connected to an upper end of the support shaft (40), wherein the plurality of spray holes (61) are mounted on the spray pipe (60) in a direction perpendicular to the discharge direction of the fluid material from the nozzle (10), and is configured to spray the fluid material onto a side surface of a wall body of the printed object extruded from the nozzle (10).

2. The 3D printer for construction of claim 1, wherein a rotatable body (30) is installed on the movable body (20), the rotatable body (30) having an axis of rotation parallel to a discharge direction of the nozzle (10), and the support shaft (40) of the spray pipe (60) is connected to the rotatable body (30), such that as the rotatable body (30) rotates, the support shaft (40) and the spray pipe (60) move along a circular arc centered on the axis of rotation.

3. The 3D printer for construction of claim 2, further comprising: a planar rotatable plate (70) connected to the rotatable body (30); the elevating body (41) connected to the planar rotatable plate (70); and an elastic body (73) connected to the rotatable body (30), wherein the support shaft (40) of the spray pipe (60) is connected to the elevating body (41), and wherein the one end of the planar rotatable plate (70) is hinged to the rotatable body (30) and the other end of the planar rotatable plate (70) is connected to the rotatable body (30) via an elastic body (73), such that as the elastic body (73) is stretched or contracted, the planar rotatable plate (70) rotates on a plane.

4. The 3D printer for construction of claim 2, wherein a planar rotatable plate (70) is connected to the rotatable body (30), a roller (50) being mounted in one end of the planar rotatable plate (70), such that an inside of the planar rotatable plate (70) is hinged to the rotatable body (30);

the other end of the planar rotatable plate (70) is connected to the rotatable body 30 via an elastic body (73), such that as the elastic body (73) is stretched or contracted, the planar rotatable plate (70) rotates on a plane; and the roller (50) is in close contact with a surface of the printed object.

5. The 3D printer for construction of claim 2, wherein an annular rack (35) is installed on the rotatable body (30), the annular rack (35) having a planar center that coincides with the axis of rotation of the rotatable body (30); and a pinion (25) is installed on the movable body (20), the pinion (25) being connected to a driving motor (23) and engaged with the rack (35), wherein as the pinion (25) rotates, the rack (35) and the rotatable body (30) rotates.

6. A printed object surface-treatment type 3D printer for construction, comprising: a movable body (20); a nozzle (10) mounted on the movable body (20); a spray pipe (60) configured to follow the nozzle (10); and a plurality of spray holes (61) mounted on the spray pipe (60), wherein the nozzle (10) is configured to discharge a fluid material, wherein the spray pipe (60) is configured to move along with movement of the movable body (20) and the nozzle (10), wherein the spray pipe (60) is connected to the movable body (20) via a support shaft (40), an elevating body (41) and a rotatable body 30, wherein a range between the spray pipe (60) and a printed object is adjusted as the spray pipe (60) is lifted or lowered along with the support shaft (40) being lifted or lowered by the elevating body (41) connected to an upper end of the support shaft (40), wherein the plurality of spray holes (61) are mounted on the spray pipe (60) in a direction perpendicular to the discharge direction of the fluid material from the nozzle (10), and is configured to spray the fluid material onto a side surface of a wall body of the printed object extruded from the nozzle (10), and wherein a protruded plate (31) protruding outwardly from the periphery of the rotatable body (30) is utilized as an installation site for the spray pipe (60) on the rotatable body (30), wherein in mounting the spray pipe (60) on the protruded plate (31) of the rotatable body (30), an elongated hole is created in the protruded plate (31) and the elevating body (41) is mounted in this elongated hole, such that by adjusting a mounting position of the elevating body (41) in the elongated hole, the planar distance between the center point of the spray pipe (60) and the center point of the nozzle (10) is controlled.

7. The 3D printer for construction of claim 1, wherein a rotatable body (30) is installed on the movable body (20), the rotatable body (30) having an axis of rotation parallel to a discharge direction of the nozzle (10), and the support shaft (40) of the spray pipe (60) is connected to the rotatable body (30), such that as the rotatable body (30) rotates, the support shaft (40) and the spray pipe (60) move along a circular arc centered on the axis of rotation.

8. The 3D printer for construction of claim 7, further comprising: a planar rotatable plate (70) connected to the rotatable body (30); the elevating body (41) connected to the planar rotatable plate (70); and an elastic body (73) connected to the rotatable body (30), wherein the support shaft (40) of the spray pipe (60) is connected to the elevating body (41), and wherein the one end of the planar rotatable plate (70) is hinged to the rotatable body (30) and the other end of the planar rotatable plate (70) is connected to the rotatable body (30) via an elastic body (73), such that as the elastic body (73) is stretched or contracted, the planar rotatable plate (70) rotates on a plane.

9. The 3D printer for construction of claim 7, wherein a planar rotatable plate (70) is connected to the rotatable body (30), a roller (50) being mounted in one end of the planar rotatable plate (70), such that an inside of the planar rotatable plate (70) is hinged to the rotatable body (30);

the other end of the planar rotatable plate (70) is connected to the rotatable body 30 via an elastic body (73), such that as the elastic body (73) is stretched or contracted, the planar rotatable plate (70) rotates on a plane; and the roller (50) is in close contact with a surface of the printed object.

10. The 3D printer for construction of claim 7, wherein an annular rack (35) is installed on the rotatable body (30), the annular rack (35) having a planar center that coincides with the axis of rotation of the rotatable body (30); and a pinion (25) is installed on the movable body (20), the pinion (25) being connected to a driving motor (23) and engaged with the rack (35), wherein as the pinion (25) rotates, the rack (35) and the rotatable body (30) rotates.

* * * * *